Patented Oct. 2, 1928.

1,686,224

UNITED STATES PATENT OFFICE.

MARTIN BATTEGAY, OF MULHOUSE, FRANCE, ASSIGNOR TO CALCO CHEMICAL CO., OF BOUNDBROOK, NEW JERSEY, A CORPORATION OF NEW JERSEY.

PROCESS OF DYEING AND PRINTING AND PRODUCT OBTAINED THEREIN.

No Drawing.   Application filed November 1, 1926.   Serial No. 145,699.

My invention relates particularly to a process of dyeing and printing fibrous materials, such as textiles or other materials, and the product obtained therein, which has many advantages over previous processes, and the products made therein.

Hitherto reaction products of phenol and sulphur which are used as mordants for the fixing of basic dyestuffs, as, for example, the reaction products described in United States Patent No. 1,523,340, granted January 13, 1925 to Martin Battegay, have required more than one step in the dyeing or printing operation. One of the objects of my invention is to carry out the process by applying the dyestuff and mordant simultaneously, thereby eliminating one of the steps previously found necessary in carrying out said process.

Hitherto reaction products of phenol and sulphur for use as a mordant, as described, for example, in the United States Patent No. 1,523,340, have replaced to advantage tannin in its different applications. Such reaction products cannot, however, be substituted for tannin in the processes where tannin is mixed directly with the basic dyestuffs, as, for instance, in pastes employed for direct printing. When the reaction products are dissolved by suitable organic solvents or by aqueous solutions of alkalies they too quickly precipitate the dissolved basic dyes, thus preventing the practical use of such reaction products of phenol and sulphur in the processes where they should be dissolved simultaneously with the basic dyestuffs.

For these reasons such reaction products previously could be used only in dyeing and printing processes involving at least two operations, either by first dyeing or padding or printing the fibrous materials, such as textiles or other materials, with their solution or a paste containing them, and afterwards dyeing, padding or printing the said materials with suitable basic dyestuffs in solution or in paste, or by padding the solution or printing such paste on said materials, which may be dried, followed by a treatment with the solution of the reaction product of phenol and sulphur.

As above pointed out, one of the objects of the present invention is to carry out the dyeing or printing with these reaction products of phenol and sulphur, and all other sulphurized phenols which are soluble in water in the presence or absence of alkalies, bases, basic compounds, salts of weak acids, or weak acids, and which can be used as fixing agents and mordants for basic dyestuffs in direct dyeing and printing, in one operation. In accordance with my process, therefore, these reaction products fix on the fibrous materials such as textiles or other materials, but especially on vegetable fibres, silk, or other fibres that are not substantially detrimentally affected by bases and the pastes employed in these processes, many acid colors and salts of the same, such as sulphonated basic dyestuffs, alkali blues, soluble blues, nigrosine sulphonic acids, thioflavine S, acid violets, patent blues, thiazine reds, etc.

These dyestuffs are soluble in substantially any one of the different alkalies and bases in water, and their solutions may be mixed without substantial precipitation with an aqueous alkaline solution of any one of the reaction products of phenol and sulphur above referred to, in the presence or absence of neutral chromates. The resulting mixtures may be used either as such for dyeing the above-mentioned fibrous materials such as textiles or other materials, for the padding of such materials, or, when thickened, for direct printing on the above materials.

The operation of dyeing, or padding, or printing is followed with a fixing operation by passing the said materials through a bath of substantially any diluted organic or mineral acid or acids, or mineral acid salt, or salts of the alkali earths, or of the heavy metals, or of acid and mineral salts combined. The fixing of the dyestuff is finished by washing or soaping and rinsing, followed by drying. If desired, steaming may precede the above treatment with acid or mineral salts.

My invention is capable of embodiment in many different forms, and may be carried out in many different ways, but by way of example I may proceed in accordance with the following examples of my invention.

*Example 1.*—I dissolve 15 grams of alkali blue and 15 grams of soda ash in 200 grams of water. The solution thus obtained is added to 15 grams of the reaction product described in the United States Patent No.

1,523,340 above referred to, or any other one of the sulphurized phenols above referred to, which has been dissolved previously in 100 cc. of water, containing, for instance, 20 grams of soda ash. The mixture is then thickened with 640 grams of ordinary starch tragacanth gum, comprising generally one part by weight of starch to one part by weight of gum tragacanth. As a result a paste is obtained which is printed on a fibrous material, as, for example, a cotton or silk fabric. It will be understood, however, that if desired this mixture, although applied in the form of a paste, may be obtained by mixing together the solid materials in dry form, and thereafter applying sufficient water, as above, to produce the paste.

The fabric is then dried and passed into a fixing bath of 20 grams acetic acid in 1 liter of water. A bright blue shade results, which is subjected to the washing, soaping, rinsing and drying of the finishing operation and which is fast to all these operations.

In the above example the acetic acid may be replaced by an equivalent quantity of sulphuric acid or hydrochloric acid, or substantially any other acid as above referred to, or a mineral salt such as zinc sulphate, aluminum sulphate, barium chloride, etc. The salts used may be applied alone or mixed with an acid or acids, as above.

*Example 2.*—In accordance with this example of my invention, I mix together 15 grams of nigrosine sulphonic acid and 15 grams of soda ash or potassium carbonate, or the equivalent amount of aqua ammonia or ammonium carbonate, and then dissolve the same in 200 grams of water. A solution of 15 grams of the reaction product of phenol and sulphur, described in the United States patent above referred to, or any other one of the sulphurized phenols above referred to, in 100 cc. of water containing 15 grams of soda ash, or bases, basic compounds, salts of weak acids or weak acids is then added to the above solution. The mixture is thereafter thickened with 640 grams of the dextrine known as "British gum" dissolved in water in the ratio of one part by weight of gum to one part by weight of water. The paste thus obtained is then printed on a fabric such as above referred to. It will be understood, however, that if desired this mixture, although applied in the form of a paste, may be obtained by mixing together the above ingredients whether in dry or wet form, and thereafter applying sufficient water, as above, to produce the paste.

This gives, after drying and steaming of the printed fabric for from one to two minutes or longer, a gray dye which may, if desired, be developed by a fixing bath the same as or similar to that described in Example 1. When the fixing bath is used, if desired, the steaming may be omitted. The finishing is carried out the same as in Example 1.

*Example 3.*—In accordance with this example of my invention, 15 grams of alkali violet and 30 grams of soda ash are dissolved in 25 grams of the reaction product described in United States Patent No. 1,523,340, or any other one of the sulphurized phenols above referred to, and 500 cc. of boiling water. A woven cotton fabric is then immersed for ten minutes or longer in the above solution at 90° C., and the cotton is then centrifuged. It will be understood, however, that, if desired, this mixture, although applied in the form of a liquid, may be obtained by mixing together the solid materials in dry form or in the form of a paste, and thereafter applying sufficient water, as above, to produce the liquid.

The dyed fabric may then be developed in a fixing bath such as described in the preceding examples, and the violet shade thus obtained is finished by washing, soaping, rinsing and drying, as above referred to.

*Example 4.*—In this example of my invention, 15 grams of acid violet 4 B and 15 grams of the reaction product of the said United States patent or any other one of the sulphurized phenols above referred to, are dissolved in 30 grams of soda ash in 1 liter of water. The fibrous material, as, for example, a cloth made of cotton, or artificial silk, is then padded with it. It will be understood, however, that, if desired, this mixture, although applied in the form of a liquid, may be obtained by mixing together the solid materials in dry form or in the form of a paste, and thereafter applying sufficient water, as above, to produce the liquid.

The dyed material is then treated with a bath of diluted acid, comprised of 20 grams of acetic acid to 1 liter of water, and containing in addition 10 grams of barium chloride for each liter of water. It is then washed, soaped, rinsed and dried.

The printed textile or other material gives a fast gray after having been dried and passed through a fixing bath as described in any one of the above examples. The product may be finished as in the preceding examples.

It will be understood that in the above examples many changes may be made not only in the materials used, but also in the proportions of the same referred to therein, and that my invention is not limited to the specific quantities of the substances given in connection with the same. Also, it is to be understood that while I have described my invention above in detail, many changes may be made therein without departing from the spirit of the same as set forth in the claims herein. Furthermore, wherever I have referred to the term "sulphurized phenols", it is to be understood that thereby I mean such combinations of sulphur and phenol which can be used as fixing agents and mordants in dyeing processes for basic dyestuffs.

I claim:

1. The process which comprises dyeing in one operation a fibrous material not substantially detrimentally affected by the substances used in treating the same, by applying thereto a mixed sulphurized phenol and a dyestuff comprised in the group of acid colors and salts of the same, to which an alkali has been added.

2. The process which comprises dyeing in one operation a fibrous material not substantially detrimentally affected by the substances used in treating the same, by applying thereto a mixed sulphurized phenol and a dyestuff comprised in the group of acid colors, to which an alkali has been added.

3. The process which comprises dyeing in one operation a fibrous material not substantially detrimentally affected by the substances used in treating the same, by applying thereto a mixed sulphurized phenol and a dyestuff comprised in the group of acid colors and salts of the same, to which an alkali has been added, and then fixing the same by applying thereto an acid or mineral salt.

4. The process which comprises dyeing in one operation a fibrous material not substantially detrimentally affected by the substances used in treating the same, by applying thereto a mixed sulphurized phenol and a dyestuff comprised in the group of acid colors, to which an alkali has been added, and then fixing the same by applying thereto an acid or mineral salt.

5. The process which comprises dyeing in one operation a fibrous material not substantially detrimentally affected by the substances used in treating the same, by applying thereto a mixed sulphurized phenol and a dyestuff comprised in the group of acid colors and salts of the same, to which an alkali has been added, drying the material, and then fixing the same by applying thereto an acid or mineral salt.

6. The process which comprises dyeing in one operation a fibrous material not substantially detrimentally affected by the substances used in treating the same, by applying thereto a mixed sulphurized phenol and a dyestuff comprised in the group of acid colors, to which an alkali has been added, drying the material, and then fixing the same by applying thereto an acid or mineral salt.

7. The process which comprises dyeing in one operation a fibrous material not substantially detrimentally affected by the substances used in treating the same, by applying thereto, in the form of a liquid, a mixed sulphurized phenol and a dyestuff comprised in the group of acid colors and salts of the same, to which an alkali has been added.

8. The process which comprises dyeing in one operation a fibrous material not substantially detrimentally affected by the substances used in treating the same, by applying thereto, in the form of a liquid, a mixed sulphurized phenol and a dyestuff comprised in the group of acid colors, to which an alkali has been added.

9. The process which comprises dyeing in one operation a fibrous material not substantially detrimentally affected by the substances used in treating the same, by applying thereto, in the form of a liquid, a mixed sulphurized phenol and a dyestuff comprised in the group of acid colors and salts of the same, to which an alkali has been added, and then fixing the same by applying thereto an acid or mineral salt.

10. The process which comprises dyeing in one operation a fibrous material not substantially detrimentally affected by the substances used in treating the same, by applying thereto, in the form of a liquid, a mixed sulphurized phenol and a dyestuff comprised in the group of acid colors, to which an alkali has been added, and then fixing the same by applying thereto an acid or mineral salt.

11. The process which comprises dyeing in one operation a fibrous material not substantially detrimentally affected by the substances used in treating the same, by applying thereto, in the form of a liquid, a mixed sulphurized phenol and a dyestuff comprised in the group of acid colors and salts of the same, to which an alkali has been added, drying the material, and then fixing the same by applying thereto an acid or mineral salt.

12. The process which comprises dyeing in one operation a fibrous material not substantially detrimentally affected by the substances used in treating the same, by applying thereto, in the form of a liquid, a mixed sulphurized phenol and a dyestuff comprised in the group of acid colors, to which an alkali has been added, drying the material, and then finishing the same by applying thereto an acid or mineral salt.

13. The process which comprises dyeing in one operation a fibrous material not substantially detrimentally affected by the substances used in treating the same, by applying thereto, in the form of a liquid, a mixed sulphurized phenol and nigrosine sulphonic acid, to which an alkali has been added, drying the material, and then finishing the same by applying thereto an acid or mineral salt.

14. A composition of matter, comprising a sulphurized phenol, a dyestuff comprised in the group of acid colors and sales of the same, and an alkali.

15. A composition of matter, comprising a sulphurized phenol, a dyestuff comprised in the group of acid colors, and an alkali.

16. A composition of matter in dry form, comprising a sulphurized phenol, a dyestuff comprised in the group of acid colors and salts of the same, and an alkali.

17. A composition of matter in dry form, comprising a sulphurized phenol, a dyestuff comprised in the group of acid colors, and an alkali.

18. A composition of matter in the form of a paste, comprising a sulphurized phenol, a dyestuff comprised in the group of acid colors and salts of the same, and an alkali.

19. A composition of matter in the form of a paste, comprising a sulphurized phenol, a dyestuff comprised in the group of acid colors, and an alkali.

20. A composition of matter in the form of a liquid, comprising a sulphurized phenol, a dyestuff comprised in the group of acid colors and salts of the same, and an alkali.

21. A composition of matter in the form of a liquid, comprising a sulphurized phenol, a dyestuff comprised in the group of acid colors, and an alkali.

22. A composition of matter in the form of a liquid, comprising a sulphurized phenol, nigrosine sulphonic acid, and an alkali.

In witness whereof I have hereunto signed my name this 7th day of October, 1926.

MARTIN BATTEGAY.